United States Patent [19]

Emmons et al.

[11] 4,115,169
[45] Sep. 19, 1978

[54] POLYFUNCTIONAL ESTER KETIMINES, ADHESIVES DERIVED THEREFROM AND METHOD FOR ADHERING MATERIALS

[75] Inventors: William D. Emmons; Samuel S. Kim, both of Huntingdon Valley; Donald A. Winey, Warminster, all of Pa.

[73] Assignee: Rohm and Haas Company, Philadelphia, Pa.

[21] Appl. No.: 757,264

[22] Filed: Jan. 6, 1977

[51] Int. Cl.² .................... E04B 2/00; C09J 5/00
[52] U.S. Cl. ..................... 156/71; 156/331; 528/392; 560/76; 560/88; 560/196; 260/566 R; 427/390 R; 526/312
[58] Field of Search ............ 156/71, 331; 427/390 R; 52/746; 428/411, 524; 260/475 N, 485 J, 566 R, 37 N, 75 T, 78.41, 63 N; 526/11.1, 312

[56] References Cited

U.S. PATENT DOCUMENTS

| | | |
|---|---|---|
| 3,037,969 | 6/1962 | Hankins et al. .................... 526/312 |
| 3,110,732 | 11/1963 | Speranza et al. .................. 252/8.57 |
| 3,182,073 | 5/1965 | Loncrini .......................... 260/75 T |
| 3,497,485 | 2/1970 | Emmons .............................. 526/89 |
| 3,523,925 | 8/1970 | Kamal et al. ..................... 260/37 N |
| 3,531,342 | 9/1970 | Dorn ................................. 156/71 |

*Primary Examiner*—William A. Powell
*Assistant Examiner*—J. J. Gallagher

[57] ABSTRACT

Bis-ketimine esters of the general formula

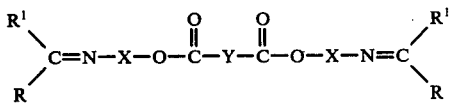

wherein, for example,
R and R¹ are alkyl groups,
X is alkylene, and
Y is the non-carboxyl moiety of a dicarboxylic acid,
are disclosed. Said compound is mixed with an acid polymeric anhydride to form an ambient moisture-curable adhesive composition.

21 Claims, No Drawings

POLYFUNCTIONAL ESTER KETIMINES, ADHESIVES DERIVED THEREFROM AND METHOD FOR ADHERING MATERIALS

This invention concerns new compounds which may generally be referred to as polyfunctional ester ketimines. It also concerns adhesive compositions made from said ketimines which are particularly useful as carpet glue down adhesives.

Emmons, U.S. Pat. No. 3,497,485, describes terminally unsaturated acryloxyalkyloxyalkyl ketimines, for example, of the structure

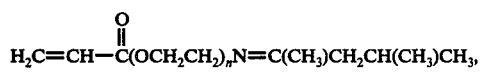

which are polymerized or copolymerized with other ethylenically unsaturated monomers to form polymeric compositions useful as coatings and impregnants for fibrous materials.

Emmons, U.S. Pat. No. 3,864,335, discloses a class of polyfunctional ester oxazolidines, for example of the following structure where $C_3H_7$ represents the isopropyl radical,

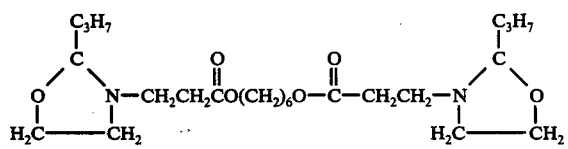

which fused ring compounds are mixed with other functional compounds to form curable coating compositions. In addition to being different in structure from said oxazolidines, the compositions of the present invention embody adhesives having generally improved properties.

The compounds of this invention are bis-ketimine esters of the formula

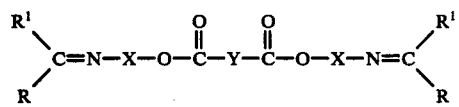

wherein

R and $R^1$ are independently selected from the group consisting of straight chain, branched chain, and cyclic alkyl groups having up to 18 carbon atoms, or R and $R^1$ are joined to form a cyclic alkyl group having 4 to 11 carbon atoms; preferably R and $R^1$ are branched and have from 3 to 5 carbon atoms;

X is a divalent alkylene radical having 2 to 10 carbon atoms or an oxyalkylene chain having 2 to 5 repeating units of the structure —$OCHR^2CHR^2$— where $R^2$ is hydrogen or methyl; and Y is the non-carboxyl moiety of a dicarboxylic acid, saturated, or aromatic, preferably selected from the group consisting of malonic, succinic, methylmalonic, isosuccinic, glutaric, adipic, pimelic, sebacic, azelaic, 1,6-ethylhexanedioic, dodecanedioic, 1,18,-octadecanedioic, 1,36-hexatriacontanedioic, α-methyleneglutaric, o-phthalic, terephthalic, isophthalic, tetrachlorophthalic, mellitic and pyromellitic acid, or an acid-terminated polyester chain prepared from the above acids and ethylene glycol, propylene glycol, or 1,4-butanediol isobutylene glycol.

The initial step in the preparation of the composition of this invention is the synthesis of a ketiminoalkanol which may be accomplished in accordance with the teachings of U.S. Pat. No. 3,110,732 whereby an alkanolamine, such as monoethanolamine, 1-amino-2-propanol, 2-amino-1-propanol, 3-amino-propanol, 2-(2-aminoethoxy)ethanol, (and higher ethylene oxide and propylene oxide analogs), 1-amino-2-butanol, 2-amino-3-butanol and the like, is reacted with an alkyl ketone such as dimethyl ketone, methyl ethyl ketone, methyl n-propyl ketone, diethyl ketone, methyl n-butyl ketone, methyl isobutyl ketone, methyl n-amyl ketone, methyl n-butyl ketone, di-n-propyl ketone, diisopropyl ketone, methyl n-hexyl ketone, diisobutyl ketone, methyl n-nonyl ketone, di-n-heptadecyl ketone, cyclohexyl methyl ketone, cyclohexyl isobutyl ketone, cyclohexanone, methyl cyclohexanone, and the like, the sterically hindered ketones being preferred. The reaction mechanism may be depicted as follows:

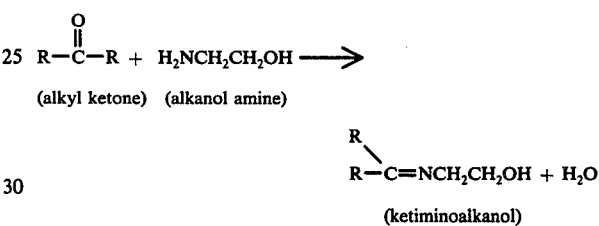

The next step in preparing the compositions embodied herein is to react the said ketiminoalkanol with a polycarboxylic acid, preferably via a transesterification reaction with a lower alkyl, e.g., methyl ester of the acid, for example, of the saturated dicarboxylic acids, exemplified by malonic, succinic, methylmalonic, isosuccinic, glutaric, adipic, pimelic, sebacic, azelaic, 1,6-ethylhexanedioic, dodecanedioic, 1,18-octadecanedioic, 1,36-hexatriacontanedioic, and the like; aromatic dicarboxylic acids, e.g., o-phthalic, terephthalic, isophthalic, tetrachlorophthalic, mellitic and pyromellitic; and acid group-terminated polyester chains resulting from the addition of ethylene glycol, propylene glycol or isobutylene glycol to the foregoing acids. Generally, such polyester chains will have from one to ten repeating units. The preferred polycarboxylic acids are adipic, azelaic, sebacic and terephthalic.

The reaction mechanism may be depicted as follows for representative reactants:

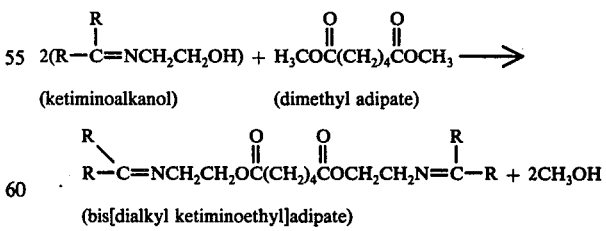

The transesterification reaction is desirably base catalyzed, suitable catalysts including sodium phenoxide, sodium methoxide, sodium ethoxide, or the like, generally in amounts of about 1 to 5 percent by weight of the ketiminoalkanol. A reaction diluent such as toluene may be used. Temperatures on the order of about 60° C. to about 180° C. are employed, and the completion of reaction is readily determined by measuring the quantity of alcohol liberated therein and comparing this amount to the theoretical yield.

In another aspect of this invention, the bis-ketimine ester compounds of this invention are especially useful in preparing ambient moisture-curable compositions comprised of an admixture thereof with an organic acid polyanhydride, such compositions being utilized as high-solids adhesives for gluing down carpet and other coating applications. In general, from about one to about ten parts by weight of polymeric anhydride component are present in the adhesive per one part by weight of bis-ketimine ester. The terms polyanhydride and polymeric anhydride are meant to embrace polymers having two or more pendant anhydride groups. Preferred are those polyanhydrides prepared from maleic anhydride and one or more monomers selected from $C_1$–$C_{18}$ alkyl acrylate or methacrylate, a polyunsaturated fatty acid derivative such as tung oil, an $\alpha$-olefin such as 1-octene, 1-decene, 1-dodecene, 1-hexadecene, and the like, vinyl ethers such as methyl vinyl ether, butyl vinyl ether and the like, vinyl acetate, ethylene and styrene. Especially preferred is the polyanhydride prepared from polyunsaturated fatty acid esters and most preferably tung oil and maleic anhydride and the polyanhydride prepared from maleic anhydride $C_3$–$C_6$ acrylates and methacrylates and most preferably butyl acrylate and maleic anhydride.

The reaction of tung oil with maleic anhydride affords a polyanhydride product having the structure:

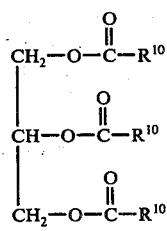

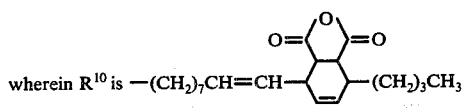

The polymerization of butyl acrylate and maleic anhydride affords a polyanhydride which is a butyl acrylate/maleic anhydride random copolymer.

Ordinary fillers, i.e., finely-divided inorganic material, such as talc, clay, and titanium dioxide, may be incorporated in the adhesive compositions in amounts of up to about 50% of the total weight of the formulation, a marked improvement over emulsion latex adhesive formulations which can be loaded with a maximum of only about 13% filler.

The curing or crosslinking mechanism involved in the bis-ketimine ester/acid anhydride adhesive system is the result of ambient moisture first reacting with the ketimine compound to form free amine and liberate ketone by-product, as depicted below for a representative structure:

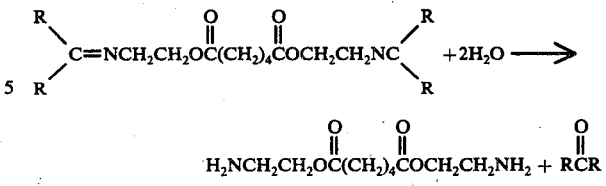

The above free primary amine groups react with anhydride groups on a polymeric molecule to form a network joined by amide crosslinks. Thus when, for example, the R groups are isobutyl, the curing of the adhesive composition evolves diisobutyl ketone, a rather innocuous material compared to the obnoxious and toxic aldehydes, e.g., isobutyraldehyde, evolved by the preferred class of the bis-oxazolidines of U.S. Pat. No. 3,864,335 in similar formulations.

Another advantage of the adhesive compositions embodied herein is their improved storage stability, i.e., longer shelf life, when the bis-ketimine ester is derived from a bulky, sterically-hindered ketone, as evidenced by the fact that viscosities of the mixtures do not appreciably increase for periods of five months and longer when stored at ambient temperature.

The adhesive composition is particularly advantageous in the glue down installation of outdoor carpeting on patios and around swimming pools, and for synthetic turfs on football fields, tennis courts and other recreational areas. In this connection, an advantage is the possibility of early use after installation and no need to protect the freshly installed carpet from rainfall. Moreover, except for protection against excessive moisture contamination, the containers of the adhesive need not be given stringent attention because of the absence of solvent therein. In addition, these solvent-free formulations are adaptable to spray application of the adhesive.

The invention is demonstrated by the following examples which are illustrative but not limitative thereof.

PREPARATION OF DIISOBUTYL KETIMINOETHANOL

To a flask equipped with stirring and heating means are charged diisobutyl ketone (852 gm.), 5 moles ethanolamine (95% active ingredient, 321 gm.), and 300 gm. toluene as diluent. The flask is attached to a ten Plate Oldershaw column topped with a water separating Dean-Stark trap. The mixture is heated to reflux, pot temperature 122°–140° C., head temperature 85°–112° C. After twelve hours at reflux and a collection of 90 gm. of aqueous distillate, the heating is terminated. The distillate titers 21% of ethanolamine from which a conversion of 70–75% is calculated.

The Oldershaw column is replaced with a six-inch Vigreaux column equipped with a vacuum distillation head. The toluene and then the unreacted ketone are stripped off. The product ketimine derivative,

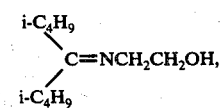

is distilled at 103°–105° C./7mm. Hg. It is a clear, colorless liquid (607 gm., 65% yield); gas-liquid chromotographic (GLC) and infrared (IR) analyses indicate a high-purity product. A relatively small (55 gm.) residue remains in the pot.

Preparation of Bis(diisobutyl ketiminoethyl) Adipate

To a two-liter flask equipped with heating means, stirrer, sample septum and ten-plate Oldershaw column are charged the above-prepared diisobutyl ketiminoethanol (407 gm.), dimethyl adipate (174 g.), and toluene (reaction diluent, 400 gm.). The pressure in the system is reduced to 200 mm. Hg., and the reaction mixture heated to reflux whereupon 73 gm. of toluene is removed to ensure an anhydrous system. This toluene is replaced with dry, reagent grade toluene.

When the pot temperature reaches 60° C. (at 250 mm. Hg.), 25% sodium methoxide in methanol solution (4.4 gm.) is introduced via hypodermic needle through the sample septum. The automatic head is set to provide 50% distillation to a maximum temperature of 45° C. The reaction mixture is held at 60°–80° C. and a methanol/toluene azeotrope is taken off (b.p. ca. 35° C. at 200 mm. Hg.). As the reaction proceeds and the methanol by-product formation slows, the distillate removal is decreased to 10%. The end of reaction is indicated by the head temperature increase to ca. 65° C. at 200 mm., the boiling point of toluene. About 5 to 6 hours are required for completion, and a recharge of catalyst (about half of initial sodium methoxide addition) is helpful. The course of reaction is monitored by the GLC of the flask contents.

The reactor contents are cooled and 8.4 gm. NaHCO₃ (and 4 gm. "Celite" diatomaceous material) are added to decompose the catalyst. The contents are filtered, and the solution is charged to a distillation flask. The toluene is stripped at ca. 100 mm. Hg.. The product (470 gm., 98% yield) of the formula:

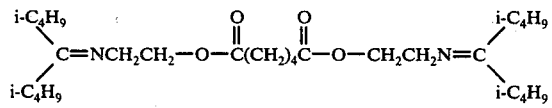

is recovered as a viscous, hazy amber liquid.

Preparation of Bis(ketimino) polyester

To the reaction flask equipped with sample septum and Oldershaw column described earlier are charged methyl isobutylketiminoethanol (315 gm.), dimethyl adipate (348 gm.), 1,4-butanediol (90.1 gm.), and toluene (reaction diluent, 700 gm.). Pressure is reduced to 200 mm. Hg. and the mixture heated to reflux to remove 91 g. toluene to ensure anhydrous conditions; this toluene is replaced with dry, reagent grade toluene and heating is reapplied.

When the pot temperature reaches 60° C. (at 200 mm. Hg.), 8.6 gm. of a 25% solution of sodium methoxide in methanol is introduced via hypodermic needle through the sample septum. The automatic head is set to provide 50% distillation to a maximum of 45° C. The pot temperature is held at 60°–80° C., and a methanol/toluene azeotrope is taken off (b.p. ca. 35° C. at 200 mm. Hg.). When methanol by-product formation slows, the distillate removal is decreased to 10%. The completion of reaction is indicated by an increase of head temperature to ca. 65° C. at 200 mm. Hg., the boiling point of toluene. Around 12 hours are required for completion with a recharge of catalyst (about half of initial amount) after 6 hours being helpful.

The reactor contents are cooled and 4.2 gm. NaHCO₃ added to decompose the catalyst. The mixture is filtered and toluene is stripped from the filtrate on a Rota-Evaporator under reduced pressure (20 mm. Hg.). The product is recovered by evaporation on a wiped film still (at 90°–95° C. and 0.4 mm. Hg.) as a viscous, hazy amber liquid having the structure:

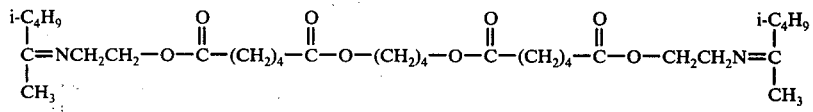

It may be noted that the portion

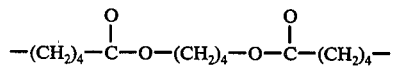

of the foregoing formula is the moiety between the terminal carboxyl groups of the acid terminated polyester chain.

PREPARATION OF POLYMERIC ANHYDRIDES

A two liter resin kettle equipped with a stainless steel stirrer, stainless steel immersion coil for steam heating, thermometer and reflux condenser is charged with 238.2 g. of maleic anhydride and 890.5 g. of tung oil (Pacific Vegetable Oil Corporation). Steam heating is applied to melt the maleic anhydride (60°–70° C. and discontinued at 70° C.). The exothermic reaction then proceeds spontaneously, reaching a maximum temperature of 132.5° C. The mixture is allowed to cool to 97° C. when steam heat is again applied and maintained for a total reaction time of 2 hours. The product weighs 1127 g. and contains 0.37% unreacted maleic anhydride (1.75% of charged maleic anhydride). Anhydride titration gives a value of 2.9 meq. anh./g. (anhydride functionality 2.43). The clear amber liquid has a Gardner-Holdt viscosity at 25° or Z-6+, contains 2.17 ± 0.04 meq. of anhydride/g., 0.05 meq. free acid/g. and less than 1.0% free maleic anhydride.

A butyl acrylate/maleic anhydride copolymer is prepared as follows: To a three liter, 4 necked, round bottomed flask equipped with a stirrer, thermometer, condenser and addition funnel is added 338.6 g. toluene, 142.5 g of butyl acrylate, 22.5 g. maleic anhydride and 0.5 g. of t-butyl peroctoate. The contents are heated to reflux (114° C.) and held for 15 minutes. A monomer mixture composed of 757.5 g. of butyl acrylate, 77.5 g. maleic anhydride and 2.5 g. of t-butyl peroctoate is fed at a uniform rate over the next 2¾ hours to the reaction contents held at 115° C. The mixture is then held at 115° C. for 15 minutes and then "chased" with 3.0 g. t-butyl peroctoate dissolved in 97 g. of toluene fed over 45 minutes. The reaction flask is equipped with a Dean-Stark apparatus and azeotroped to dryness — 19.5 g. of water and toluene are removed. The product has 69.8% solids (99.3% monomer conversion) with a viscosity of 3640 cps. (91.7% of the maleic anhydride is converted to polymer and the polymer has a number average molecular weight of 10,000; therefore, an anhydride functionality of 10.).

Preparation and Utilization of Carpet Adhesive

A small Brabender mixer is charged with 364 g. of the tung oil - maleic anhydride adduct prepared as above, and 454 g. of talc is mixed in for 20 minutes. Then over a period of 10 minutes, 180 grams of bis[2-(diisobutylketimino)ethyl]-adipate prepared as above is added with mixing as dry nitrogen gas is passed over the ingredients to prevent moisture from initiating the curing reaction.

The above-prepared adhesive composition is spread on a concrete floor with a 1/16 inch notched trowel. Nylon cut pile construction carpet is unrolled onto the spread adhesive and shifted into the desired position. By the next day the carpet is firmly adhered to the floor. For the next five months the carpet is subjected to heavy pedestrian traffic and intermittent vacuuming. At the end of the five months, the carpet is shampooed with a Clarke jet cleaning machine. The shampooing causes no loosening or lifting of the carpet. Similarly good results are obtained with a like adhesive formulation containing no fillers.

A similarly efficacious carpet adhesion is formulated with bis[2-diisobutylketimino)ethyl]terephthalate and the tung oil-maleic anhydride adduct used above.

Another good performing carpet adhesive is similarly formulated with bis[2-methylisobutylketimino(ethyl)]adipate and a polymeric anhydride of 95 parts by weight of butyl acrylate and 5 parts by weight of maleic anhydride.

In like manner, the tung oil-maleic anhydride adduct is mixed with the bis(ketimino)polyester prepared as described hereinabove to provide an adhesive formulation having good properties.

What is claimed is:

1. A compound of the formula:

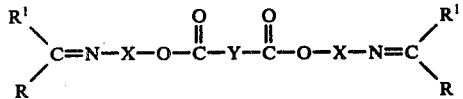

wherein
R and R$^1$ are independently straight chain, branched chain, or cyclic alkyl groups having up to 18 carbon atoms, or R and R$^1$ joined together form a cyclic alkyl group having 4 to 11 carbon atoms;
X is a divalent alkylene radical having 2 to 10 carbon atoms or an oxyalkylene chain having 2 to 5 repeating units of the structure —OCHR$^2$CHR$^2$— where R$^2$ is hydrogen or methyl; and
Y is the non-carboxyl moiety of a saturated, or aromatic dicarboxylic acid, or acid terminated polyester chain thereof with ethylene glycol, propylene glycol or isobutylene glycol.

2. A compound in accordance with claim 1 wherein Y is the moiety selected from the group of dicarboxylic acids consisting of malonic, succinic, methylmalonic, isosuccinic, glutaric, adipic, pimelic, sebacic, azelaic, 1,6-ethylhexanedioic, dodecanedioic, 1,18-octadecanedioic, 1,36-hexatriacontanedioic, o-phthalic, terephthalic, isophthalic, tetrachlorophthalic, mellitic, pyromellitic, and acid-terminated polyester prepared from any of said acids and ethylene glycol, 1,4-butanediol propylene glycol or isobutylene glycol.

3. Bis[2-(diisobutylketimino)ethyl]adipate.

4. Bis[2-(diisobutylketimino)ethyl]terephthalate.
5. Bis[2-(methylisobutylketimino)ethyl]adipate.
6. A moisture-curable adhesive and coating composition comprised of a mixture of (A) one part by weight of a bis-ketimino ester of the formula:

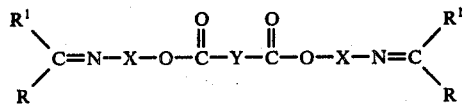

wherein
R and R$^1$ are independently straight chain, branched chain, or cyclic alkyl groups having up to 18 carbon atoms, or R and R$^1$ joined together form a cyclic alkyl group having 4 to 11 carbon atoms;
X is a divalent alkylene radical having 2 to 10 carbon atoms or an oxyalkylene chain having 2 to 5 repeating units of the structure —OCHR$^2$CHR$^2$— where R$^2$ is hydrogen or methyl; and
Y is the non-carboxyl moiety of a saturated, or aromatic dicarboxylic acid, or acid terminated polyester chain thereof with ethylene glycol, 1,4-butanediol, propylene glycol or isobutylene glycol; and (B) from about one to about ten parts by weight of organic acid polyanhydride.

7. A composition in accordance with claim 6 wherein in component (A), R and R$^1$ are branched and have from 3 to 5 carbon atoms and Y is the moiety selected from the group of dicarboxylic acids consisting of malonic, succinic, methyl malonic, isosuccinic, glutaric, adipic, pimelic, sebacic, azelaic, 1,6-ethylhexanedioic, dodecanedioic, 1,18-octadecanedioic, 1,36-hexatracontanedioic, o-phthalic, terephthalic, isophthalic, tetrachlorophthalic, mellitic, pyromellitic, and acid-terminated polyester prepared from any of said acids and ethylene glycol, propylene glycol or isobutylene glycol.

8. A composition according to claim 6 wherein component (A) is bis[2-(diisobutylketimino)ethyl]adipate.

9. A composition according to claim 6 wherein component (A) is bis[2-(diisobutylketimino)ethyl]terephthalate.

10. A composition according to claim 6 wherein component (A) is bis[2-(methylisobutylketimino)ethyl]adipate.

11. A composition according to claim 6 in which is incorporated, in an amount of up to about 50% of the total weight thereof, finely-divided inorganic filler.

12. A method of gluing down carpet which comprises applying the composition of claim 6 as the adhesive therefor and allowing the adhesive to cure in the presence of moisture.

13. The method according to claim 12 wherein the adhesive composition contains up to 50% of finely-divided inorganic filler.

14. A method of adhering two materials to one another comprising applying the composition of claim 6 to at least one of the materials, placing the two materials in contact with one another, and curing the composition.

15. A method of coating or impregnating a material comprising the steps of applying the composition of claim 6 in liquid form to the material, and curing the composition.

16. The compound of claim 2 in which Y is the non-carboxyl moiety of a saturated dicarboxylic acid.

17. The compound of claim 2 in which Y is the non-carboxyl moiety of an aromatic dicarboxylic acid.

18. The compound of claim 2 in which Y is the moiety between terminal carboxyl groups of an acid terminated polyester chain of a saturated or aromatic dicarboxylic acid with ethylene glycol, propylene glycol, 1,4-butanediol, or isobutylene glycol, there being from one to ten repeating units in said polyester chain.

19. A moisture curable adhesive and coating composition as in claim 7 in which Y is the non-carboxyl moiety of a saturated dicarboxylic acid, and which composition is solvent free.

20. A moisture curable adhesive and coating composition as in claim 7 in which Y is the non-carboxyl moiety of an aromatic dicarboxylic acid, and which composition is solvent free.

21. A moisture curable adhesive and coating composition as in claim 7 in which Y is the moiety between the terminal carboxyl groups of said polyester chain, said poleyster chain having from one to ten repeating units, and which composition is solvent free.

* * * * *